United States Patent
Kim et al.

(10) Patent No.: US 11,463,033 B2
(45) Date of Patent: Oct. 4, 2022

(54) APPARATUS, SYSTEM, AND METHOD FOR CONTROLLING MOTOR

(71) Applicant: LG Electronics Inc., Seoul (KR)

(72) Inventors: Kwangsik Kim, Seoul (KR); Minho Jang, Seoul (KR); Hansu Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 16/739,690

(22) Filed: Jan. 10, 2020

(65) Prior Publication Data

US 2020/0228039 A1    Jul. 16, 2020

(30) Foreign Application Priority Data

Jan. 11, 2019 (KR) .................. 10-2019-0004136

(51) Int. Cl.
*H02P 21/12* (2016.01)
*H02P 27/12* (2006.01)
*H02P 21/22* (2016.01)

(52) U.S. Cl.
CPC ............. *H02P 21/12* (2013.01); *H02P 21/22* (2016.02); *H02P 27/12* (2013.01); *H02P 2209/11* (2013.01)

(58) Field of Classification Search
CPC ...... H02P 21/32; H02P 21/34; H02P 2203/03; H02P 21/16; H02P 21/12; H02P 27/12; H02P 21/22; H02P 2209/11; H02P 6/185; H02P 8/10; H02P 8/18; H02P 27/085; H02P 2209/07
See application file for complete search history.

(56) References Cited

U.S. PATENT DOCUMENTS

| | | | |
|---|---|---|---|
| 6,172,498 B1 * | 1/2001 | Schmidt | G01D 5/2006 318/685 |
| 7,388,367 B2 * | 6/2008 | Stauder | G01D 5/2006 310/68 B |
| 8,519,650 B2 * | 8/2013 | Basic | H02P 6/185 318/400.09 |
| 10,050,571 B2 * | 8/2018 | Jang | D06F 37/304 |
| 2020/0127587 A1 * | 4/2020 | Roemmelmayer | H02P 6/18 |

FOREIGN PATENT DOCUMENTS

KR    20160136931    11/2016

* cited by examiner

*Primary Examiner* — Bickey Dhakal
(74) *Attorney, Agent, or Firm* — Fish & Richardson P.C.

(57) ABSTRACT

Disclosed is about an apparatus, a system, and a method aligning a position of a rotor by applying a specific current to align the rotor a plurality of times to reduce vibration and noise when starting an operation of the motor to align the position of the rotor.

20 Claims, 5 Drawing Sheets

APPARATUS, SYSTEM, AND METHOD FOR CONTROLLING MOTOR

CROSS-REFERENCE TO RELATED APPLICATION

Pursuant to 35 U.S.C. § 119(a), this application claims the benefit of the earlier filing date and the right of priority to Korean Patent Application No. 10-2019-0004136, filed on Jan. 11, 2019, the contents of which is incorporated by reference herein in its entirety.

BACKGROUND

1. Technical Field

The present disclosure relates to an apparatus, a system, and a method to controlling a motor, capable of aligning the motor to detect a position of the motor.

2. Description of the Related Art

The background art of the present disclosure relates to controlling of a detection and an alignment of positions of motors used in home appliances.

Exact positions of rotors need to be recognized according to an operation principle for motors used in home appliances in order to control current. Encoders, resolvers, hall sensors, and the like may be used to obtain information of positions. But such position detection devices are generally expensive, and have complicating wirings and structures such that usage environment thereof is limited. Accordingly, in recent years, a sensorless control not using position detection devices has been actively studied, but sensorless control has a problem of initial position detection. When an initial position of a motor (rotor) is not correct, a starting torque becomes smaller and a rotation direction of the motor may reverse, which may cause a danger.

Figure 1:
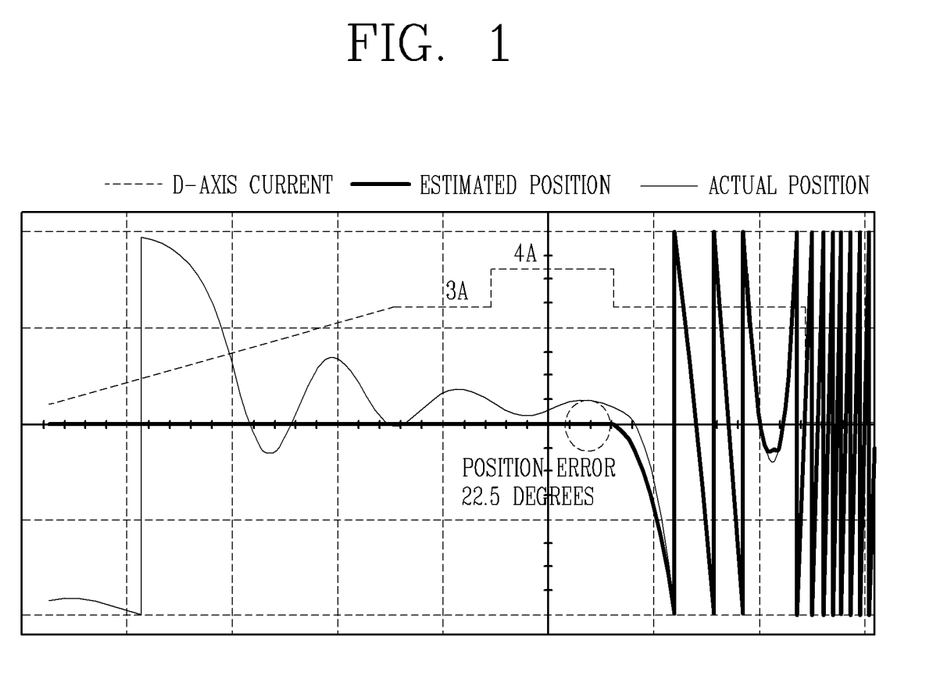
FIG. 1 is an exemplary view illustrating a result of position alignment when a position is aligned by applying a DC current in the related art.

In the related art sensorless control of a motor of a washing machine, an initial position alignment is carried out to stabilize initial starting characteristics and sensing performance. In an initial position alignment, as illustrated in FIG. 1, a DC current is applied to a d-axis, which is a magnetic flux axis of the motor, to align a position of the motor to a specific position, and then the position is detected. A stator resistance (Rs), which is an essential parameter for sensorless control, is detected by using information of voltage and current recognized at this time. In this case, if a voltage error ($\Delta V$) exists, a resistance error ($\Delta Rs$) also exists in a detection value of the resistance, thereby causing a problem in that accurate detection cannot be made.

Meanwhile, a technology to detect a stator resistance by eliminating commonly included voltage errors ($\Delta V$) by 2-point calculation is disclosed in Korean Patent Laid-open Publication No. 10-2016-0136931 (published on Nov. 30, 2016, hereinafter referred to as a prior art document) as a method to solve the problem of the errors. However, the art disclosed in the prior art document has a problem that a vibration occurs in a tub of a washing machine when applying a DC current, thereby generating a noise. In addition, the art disclosed in the prior art document has a limitation which is lowering an actual operation rate of the washing machine by performing the alignment operation for a predetermined time (about 3 seconds).

That is, the related art could partially improve a detection accuracy of the stator resistance, but there are limitations causing problems of vibration and noise of the motor (tub) due to the application of DC current and problems of the actual operation rate.

SUMMARY

The present disclosure aims to overcome the limitations of the related art described above.

That is, the present specification is to provide an apparatus, a system, and a method to overcome the above limitations of the related art.

Specifically, the present specification is to provide an apparatus, a system, and a method capable of preventing vibration and noise due to an alignment of motors.

Also, the present specification is to provide an apparatus, a system, and a method capable of reducing alignment time of motors.

In addition, the present specification is to provide an apparatus, a system, and a method capable of accurately aligning a rotor before starting operation of a motor so as to accurately detect a position of the motor and a stator resistance.

Further, the present specification is to provide an apparatus, a system, and a method capable of precisely and stably controlling an operation of the motor by accurately detecting the position of the motor and the stator resistance.

An apparatus, a system, and a method according to the present disclosure have solutions for the above problems by aligning a position of a rotor of a motor by applying a predetermined current to a stator of the motor at the time of starting operation of the motor.

Specifically, the position of the rotor is aligned by applying a current to align the rotor to reduce vibration and noise during an alignment of the rotor.

In addition, the stator resistance is detected based on a result of a voltage measurement according to each application result by applying the current a plurality of times.

In other words, the motor control apparatus, the motor control system and the motor control method according to the present disclosure have technical features aligning the position of the rotor by applying the current that is aligning the rotor a plurality of times to reduce vibration and noise when starting an operation of the motor to align the position of the rotor.

Through this solution, the motor control apparatus, the motor control system and the motor control method according to the present disclosure solve the above-mentioned problems by aligning a rotor not causing vibration or noise.

The technical features described above may be implemented by the control apparatus, the control system and the control method to control the operation of the motor through an inverter unit applying a driving power to the motor. And the present specification provides embodiments of the motor control apparatus, the motor control system and the motor control method having the above technical features as a solution.

An embodiment of a motor control apparatus according to the present disclosure having the technical features as a solution includes an inverter unit that converts an input current received from an external power source into a driving current for operating the motor by a switching operation and outputs the driving current to the motor, and a control unit that detects a motor current flowing in the motor and controls a switching operation of the inverter unit based on a result of the detection to control the operation of the motor, wherein the control unit aligns a position of the motor by controlling the switching operation such that a first waveform current and a second waveform current having a magnitude varying with time are applied to a stator of the motor before operating the motor.

In addition, an embodiment of the motor control system according to the present disclosure having the technical features as a solution includes the motor, the inverter unit that converts the input current received from the external power source into the driving current for operating the motor by the switching operation and outputs the driving current to the motor, and a control apparatus that controls the operation of the motor by the switching operation of the inverter unit, wherein the control apparatus aligns the position of the rotor of the motor by applying the first waveform current and the second waveform current having a magnitude varying with time to the stator of the motor when the motor starts operating.

Further, in an embodiment of the motor control method according to the present disclosure having the technical features as a solution, the motor control apparatus includes the inverter unit that converts the input current received from the external power source into the driving current for operating the motor by the switching operation and outputs the driving current to the motor, and the control unit that detects the motor current flowing in the motor and controls the switching operation of the inverter unit based on the result of the detection to control the operation of the motor, wherein the motor control apparatus includes an applying of the first waveform current having a magnitude varying with time to the stator of the motor, an applying of the second waveform current having a magnitude varying with time to the stator, and a detecting of stator resistance of the stator based on the result of the application of each of the first waveform current and the second waveform current.

Embodiments of the motor control apparatus, the motor control system, and the motor control method described above may be implemented as a control apparatus, a control system, and a control method to control an initial operation of the motor.

In addition, the embodiments of the motor control apparatus, the motor control system, and the motor control method described above may also be implemented as a control apparatus, a control system and a control method to align a position of the motor.

In particular, the embodiments can be implemented as a control apparatus, a control system and a control method to detect a position of the motor.

An apparatus, a system, and a method according to the present disclosure may prevent vibration and noise generated due to aligning of the motor and may reduce an alignment time of the motor, by applying a current to align the rotor a plurality of times to reduce vibration and noise when aligning the rotor.

In addition, the motor control apparatus, the motor control system and the motor control method according to the present disclosure may accurately align the rotor before starting operation of the motor and accurately detect a position of the motor and a stator resistance by aligning a position of the rotor by applying a current to align the rotor a plurality of times so that vibration and noise during the alignment of the rotor is reduced.

Further, the motor control apparatus, the motor control system, and the motor control method according to the present disclosure may accurately and stably control the operation of the motor by accurate detecting of the position of the motor and the stator resistance.

As a result, the motor control apparatus, the motor control system and the motor control method according to the present disclosure not only overcome the limitations of the related art, but also enhance stability, accuracy, easiness, effectiveness, usefulness and reliability of controlling of motors.

DETAILED DESCRIPTION OF THE EMBODIMENTS

Hereinafter, embodiments of the present disclosure will be described in detail with reference to the accompanying drawings, and the same reference numerals are used to designate the same/like components and redundant description thereof will be omitted. In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

First, a motor control apparatus (hereinafter, referred to as a control apparatus) according to the present disclosure will be described.

Figure 2:
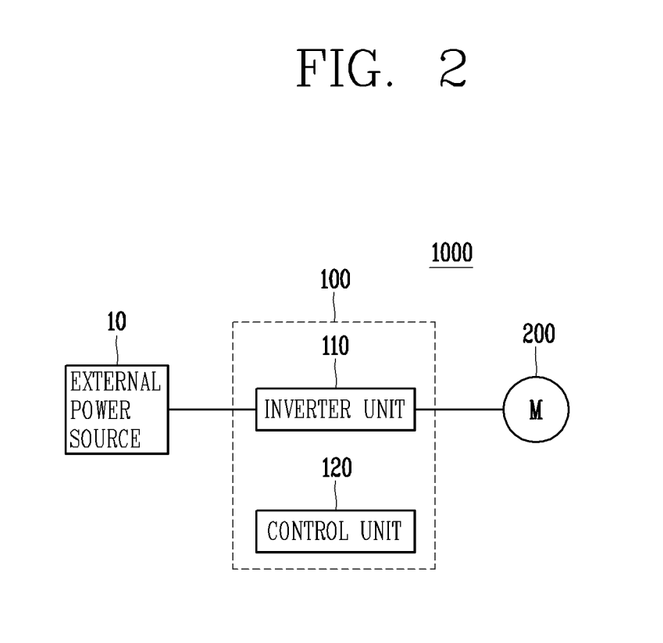
FIG. 2 is a block diagram illustrating a configuration of a motor control system including a motor control apparatus according to the present disclosure.

A control apparatus 100 refers to an apparatus to control an operation of a motor 200 in a motor control system 1000 to control the motor 200 as illustrated in FIG. 2.

The motor 200 controlled by the control apparatus 100 refers to a three-phase motor, which includes a stator and a rotor and is configured to rotate the rotor by applying three-phase AC power with a predetermined frequency to a coil of the stator.

For example, the motor 200 may be one of a surface mounted permanent magnet synchronous motor (SMPMSM), an interior permanent magnet synchronous motor (IPMSM), and a synchronous reluctance motor (Synrm).

The control apparatus 100 may be an apparatus supplying driving power to the motor 200 to control the operation of the motor 200.

The control apparatus 100 may also be a device to control an operation of the motor 200 to control a compressor including the motor 200.

The control apparatus 100 may be an inverter-type apparatus to control the motor 200.

That is, the control apparatus 100 may be an inverter to control the driving of the motor 200 or a device including the inverter.

The control apparatus 100 may control the operation of the motor 200 by controlling a switching operation of the inverter to control the driving power applied to the motor 200.

The control apparatus 100 may control the operation of the motor 200 by controlling the switching operation to control the driving power.

The control apparatus 100 may be a device to control an initial operation of the motor 200.

The control apparatus 100 may be a device to control the operation of the motor 200 in a sensorless manner.

As illustrated in FIG. 2, the control apparatus 100 may include an inverter unit 110 that converts an input current received from an external power source 10 into a driving current by the switching operation to operate the motor 200 and outputs the driving current to the motor 200, and a control unit 120 that detects a motor current flowing in the motor 200 and controls the switching operation of the inverter unit 110 based on a result of the detection to control the operation of the motor 200.

That is, the control unit 120 controls the switching operation of the inverter unit 110 based on the result of the detection of the motor current and controls the driving current converted by the switching operation, so that the control apparatus 100 may control the operation of the motor by controlling of the driving current.

As described above, in the control apparatus 100 including the inverter unit 110 and the control unit 120, the control unit 120 aligns the position of the rotor of the motor 200 by controlling the switching operation to apply a first waveform current and a second waveform current having a magnitude varying with time to the stator of the motor 200 before the motor 200 starts operating.

That is, the control apparatus 100 applies the first waveform current and the second waveform current to the stator by controlling the switching operation of the inverter unit 110 when the motor 200 starts operating, and aligns the position of the rotor.

In this way, the position of the rotor and the stator resistance of the stator can be accurately detected by aligning the position of the rotor before starting the operation of the motor 200.

As such, the initial operation control of the motor 200 based on the result of the detection is carried out accurately by accurate detecting of the position of the rotor and the stator resistance, therefore the overall operation of the motor 200 can be stably carried out.

Figure 3:
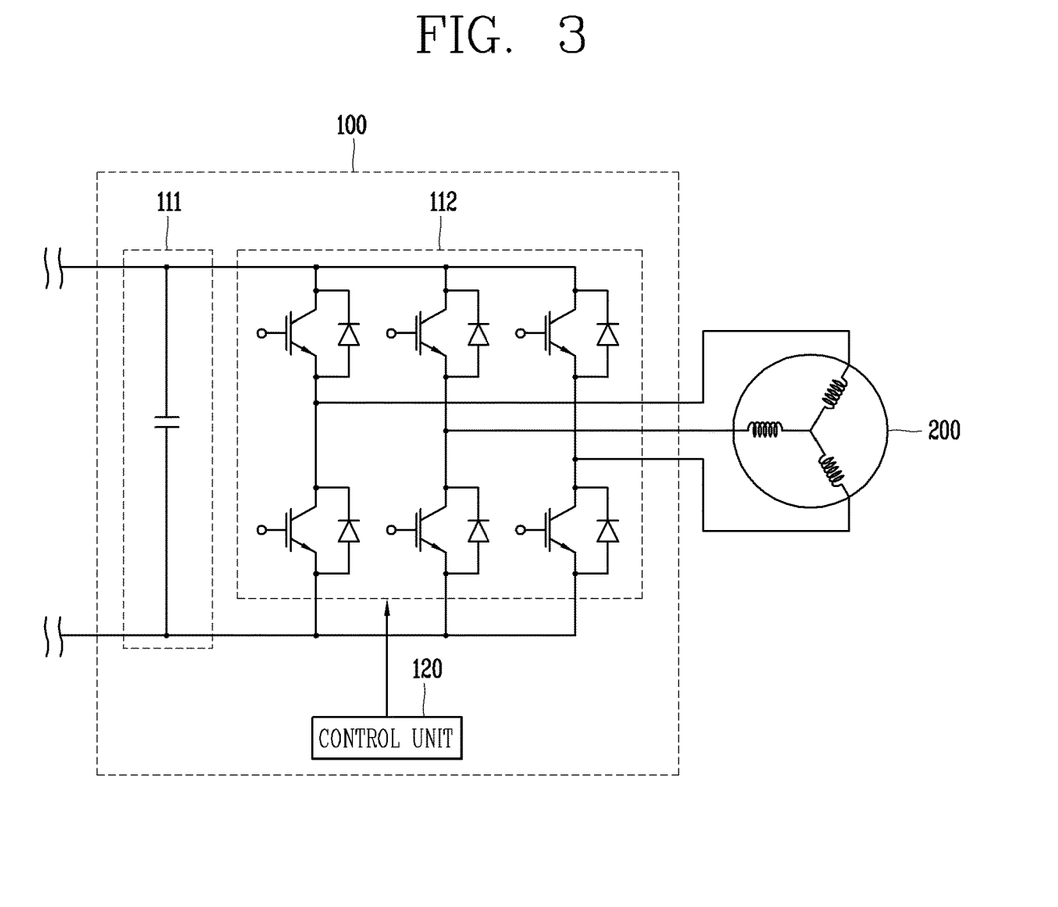
FIG. 3 is a block diagram illustrating a configuration of a motor control apparatus according to the present disclosure.

A detailed configuration of the control apparatus 100 may be the same as illustrated in FIG. 3.

As illustrated in FIG. 3, the inverter unit 110 may include an input unit 111 in which DC power or AC power is input from an external power source 10, and a switching unit 112 receiving the power input in the input unit 111 and converting the power to the driving current.

When the power input in the input unit 111 is DC power, the external power source 10 may be a battery in which DC power is stored or may be a power supply element supplying DC power.

When the power input in the input unit 111 is AC power, the external power source 10 may be a power conversion element configured to convert DC power into AC power or may be a power supply element supplying AC power.

The input unit 111 may include a smoothing capacitor that smooths an input power.

The smoothing capacitor may be a DC-link capacitor that reduces a ripple of the input power and smooths the power into a form of DC power.

When the power input in the input unit 111 is AC power, the input unit 111 may further include a rectifying unit (not shown) to rectify the AC power input from the external power source 10 into DC power.

The input unit 111 may be connected to the switching unit 112 to transfer the DC power smoothed by the smoothing capacitor to the switching unit 112.

The switching unit 112 may be connected to the motor 200 to convert the DC power received by the input unit 111 into the driving power and output the driving power to the motor 200.

Here, the driving power may be in the form of three-phase AC power.

The switching unit 112 may convert DC power into driving current with a form of AC power and output the same to the motor 200 by the switching operation.

The switching unit 112 may include a plurality of switching modules configured to convert DC power into three-phase AC power.

The plurality of switching modules may be an insulated gate bipolar transistor (IGBT).

The switching operation of the plurality of switching modules may be controlled by the control unit 120.

That is, the switching unit 112 may be controlled by the control unit 120.

The plurality of switching modules may receive an applied control signal for the switching operation from the control unit 120, and switch the DC power into AC power by the switching operation according to the control signal.

The switching unit 112 may control the operation of the motor 200 in which the switching operation is controlled by the control unit 120.

The switching unit 112 may control a driving speed of the motor 200 by controlling the driving current output to the motor 200 and applied to the motor 200, by the control of the switching operation.

Here, the driving speed may refer to a speed at which the motor 200 rotates.

The driving speed may also be replaced by a driving frequency of the motor 200 associated with the driving speed or an RPM (Revolutions Per Minute) of the motor 200.

Hereinafter, the embodiments will be described by focusing on the driving speed for the convenience of description, but the present disclosure may be implemented by replacing the driving speed with the driving frequency or the RPM.

The control unit 120, which controls the operation of the motor 200 by controlling the switching operation of the switching unit 112, detects voltage and current of the motor 200, and measures the driving speed of the motor 200 based on the detected voltage and current of the motor, and thereby controlling the switching operation according to the measured driving speed.

The control unit 120 may detect a motor voltage and a motor current applied to the motor 200 according to the switching operation, and measure the driving speed based on the motor voltage and the motor current.

The control unit 120 may generate a control signal to control the switching operation according to the driving speed, and apply the control signal to the switching unit 112 to control the switching operation.

The control unit 120 may determine at least one of command voltage for the motor voltage, a command current for the motor current, a speed command for the driving speed, and a frequency command for a switching frequency according to the driving speed, and generate the control signal according to the result of the determination.

That is, the control unit 120 may determine at least one of the command voltage, the command current, the speed command, and the frequency command based on at least one of the result of detecting the motor voltage and current and the result of measuring the driving speed so as to control at least one of the motor voltage, the motor current, the driving speed and the switching frequency by controlling the switching operation by generating the control signal according to the result of the determination.

As such, the control unit 120 may control at least one of the motor voltage, the motor current, the driving speed, and the switching frequency through the control of the switching operation, thereby controlling the operation of the motor 200.

Figure 4:
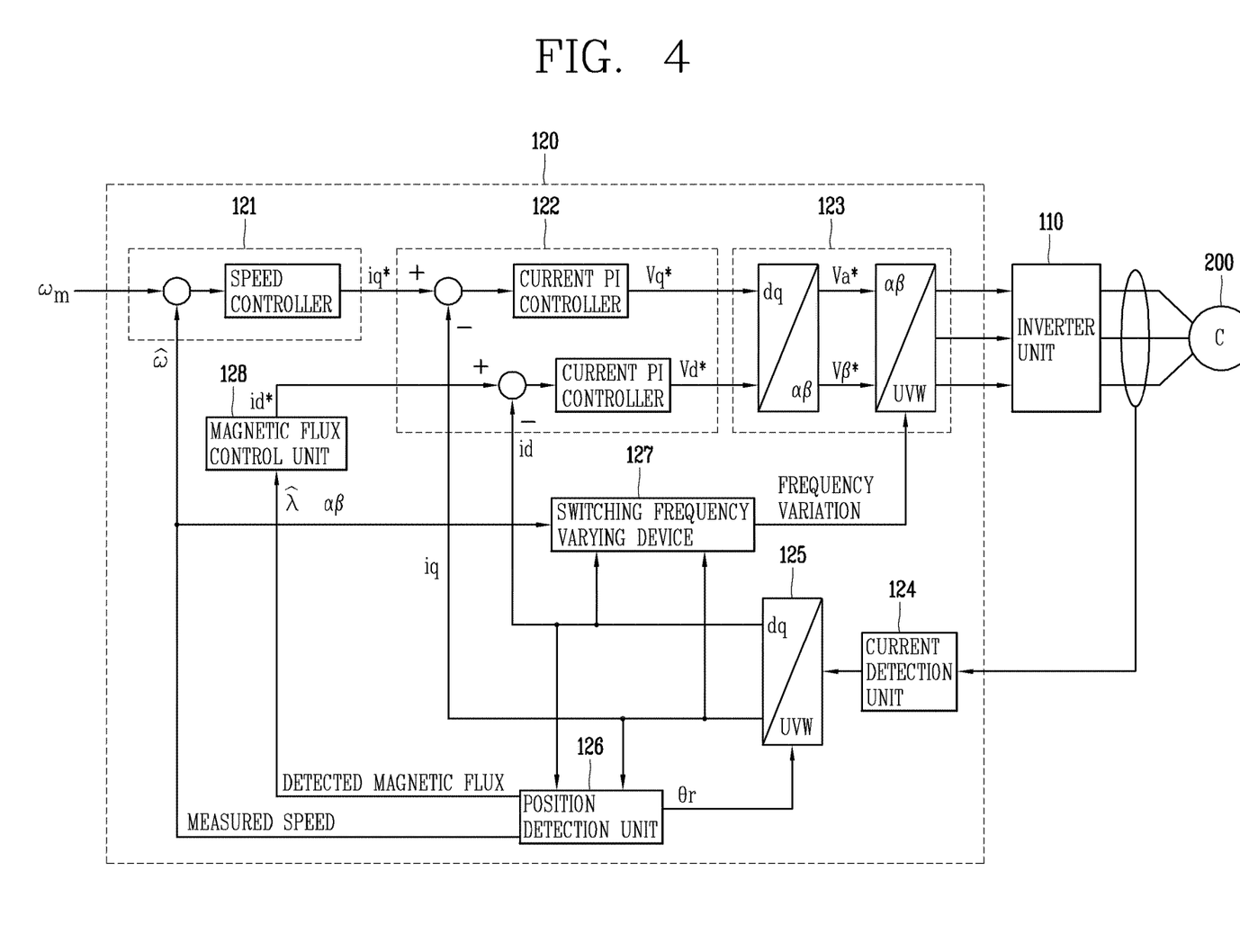
FIG. 4 is a block diagram illustrating a configuration of a control unit of a motor control apparatus in accordance with an embodiment of the present disclosure.

A detailed configuration of the control unit 120 to control the switching operation may be as illustrated in FIG. 4.

As illustrated in FIG. 4, the control unit 120 may include a speed controller 121 generating a command current according to a command speed $\omega_m$, a current controller generating the command voltage according to the command current $i_q^*$, a signal generation unit 123 converting the command voltage $V_d^*$ and $V_q^*$ into α-β/U-V-W thereby generating a PWM control signal to control the switching operation of the inverter unit 110, a current detection unit 124 detecting the motor current applied from the inverter unit 110 to the motor 200, an axial conversion unit 125 converting the measured current into U-V-W/d-q to feed back to a current controller 122, a position detection unit 126 (a sensorless controller) detecting the position of the motor 200 according to the result of the axis conversion, and measuring the driving speed according to the detected position to transfer the measured speed $\hat{\omega}$ to the speed controller 121, transferring the detected magnetic flux $\hat{\lambda}_{\alpha\beta}$ to the magnetic flux control unit 128, and transferring the result of the location detection $\theta_r$ to the axial conversion unit 125, a switching frequency varying device 127 generating a switching frequency command for the switching operation based on the result of the axis conversion and based on the measured speed and transferring the switching frequency command to the signal generation unit 123, and the magnetic flux control unit 128 generating a command current $i_d^*$ to control the magnetic flux in the current controller 122 based on the detected magnetic flux $\hat{\lambda}_{\alpha\beta}$ to transfer the command current $i_d^*$ to the current controller 122.

The control unit 120 may include the configuration of the controller described above to generate a control signal according to the driving speed, and apply the control signal to the inverter unit 110 to control the switching operation of the inverter unit 110.

As described above, the control unit 120 controlling the switching operation according to the driving speed may align the position of the rotor by controlling the switching operation to apply the first waveform current and the second waveform current having a magnitude varying with time to the stator before the motor 200 starts operating, thereby detecting the position of the rotor to control the operation of the motor 200.

That is, the control unit 120 may control the initial operation of the motor 200 after aligning the position of the rotor by controlling the first waveform current and the second waveform current to be applied by the inverter unit 110, when the motor 200 controls the initial operation.

The first waveform current and the second waveform current may be currents to align the position of the rotor.

The first waveform current and the second waveform current may be currents applied to the stator to align the position of the rotor when the motor 200 starts operating.

The first waveform current and the second waveform current may be currents having magnitudes varying with time.

That is, the first waveform current and the second waveform current may be currents of waveforms having magnitudes varying with time.

Accordingly, the control unit 120 controls the switching operation of the inverter unit 110 so that the inverter unit 110 applies a current to align the position of the rotor to the stator in a form varying with time. And the inverter unit 110 may apply the current in a form having a magnitude varying with time to align the position of the rotor on the stator by the switching operation according to the control unit 120.

The form may be a waveform that the first waveform current and the second waveform current are applied.

The form may be a preset waveform of the first waveform current and the second waveform current.

Figure 5:
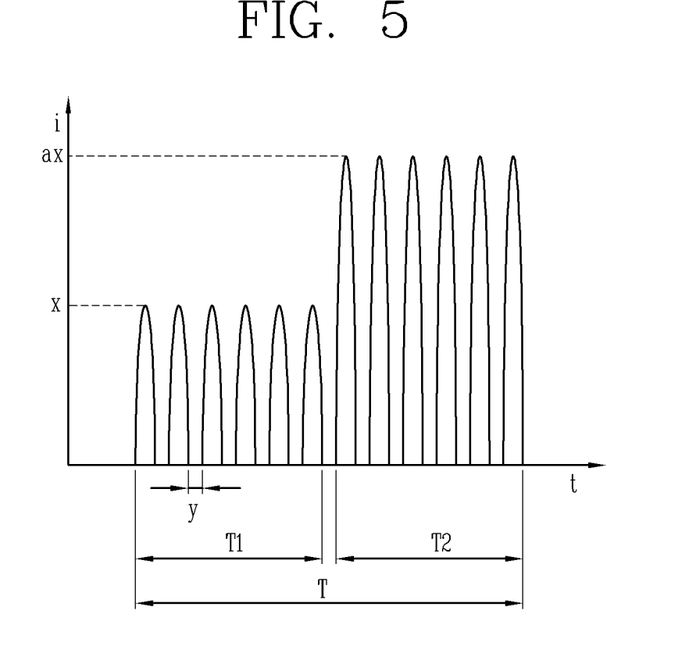
FIG. 5 is an exemplary view illustrating a waveform current in an apparatus, a system, and a method in accordance with an embodiment of the present disclosure.

The form may be a sine wave form as illustrated in FIG. 5.

That is, the first waveform current and the second waveform current may be applied to the stator in the form of sine wave whose magnitude changes with time.

Accordingly, the first waveform current and the second waveform current of the sine waveform may be applied to the stator.

The form may also be a form in which the sine wave is half-wave rectified.

That is, the first waveform current and the second waveform current may be applied to the stator in a form in which the sine wave having a magnitude varying with time is half-wave rectified to have a positive magnitude.

The form may also be a form of pulse having a plurality of cycles.

That is, the first waveform current and the second waveform current may be applied to the stator in a form of a plurality of pulses in which the sine wave having a magnitude varying with time is half-wave rectified.

The form may have a preset interval y between the pulses.

That is, the first waveform current and the second waveform current may be applied to the stator in a form of a plurality of pulses with a preset interval y in which the sine wave having a magnitude varying with time is half-wave rectified.

Here, the interval y may be an interval in units of time, or may be an electrical angle or an interval in units of phases.

The interval may be set to a 60-degree interval.

The form may be a sawtooth shape.

That is, the first waveform current and the second waveform current may be applied to the stator in a form of a sawtooth waveform.

The form may also be a form of a triangular wave.

As described above, the first waveform current and the second waveform current having a magnitude varying with time may be a d-axis current with respect to a magnetic flux axis of the motor 200.

That is, the control unit 120 controls the d-axis current to control the magnetic flux of the motor 200 to control the inverter unit 110 so that the first waveform current and the second waveform current are applied. Accordingly, the first waveform current and the second waveform current can be applied to the stator as the d-axis current.

The first waveform current and the second waveform current may be applied to the stator for a preset application time T.

That is, the control unit 120 controls the inverter unit 110 so that the first waveform current and the second waveform current is applied to the stator during the application time T, when starting the operation of the motor 200. And the inverter unit 110 may apply the first waveform current and the second waveform current to the stator during the application time T according to the control of the control unit 120.

The application time may be a time to align the position of the rotor.

The application time may be a time at which the position of the rotor is aligned by applying the first waveform current and the second waveform current.

The application time may be set within 3 seconds.

The second waveform current may be applied after the first waveform current is applied during the application time.

The second waveform current may be applied during a preset second application time T2, after the first waveform current is applied during a preset first application time T1.

The first application time T1 and the second application time T2 may refer to an application time for each of the first waveform current and the second waveform current.

That is, the first waveform current is applied during the first application time T1, and the second waveform current is applied during the second application time T2 after the first application time T1 has elapsed.

The magnitude of the second waveform current may be greater than that of the first waveform current.

That is, the first waveform current and the second waveform current may be applied to the stator in different magnitudes with a predetermined ratio.

For example, when the magnitude of the first waveform current is x[A], the magnitude of the second waveform current may be ax[A].

The first waveform current and the second waveform current may be currents according to a preset application reference.

That is, the control unit 120 controls the switching operation of the inverter unit 110 so that the first waveform current and the second waveform current are applied to the stator according to the application reference. Accordingly, the inverter unit 110 may apply the first waveform current and the second waveform current to the stator according to the application reference.

The application reference may include at least one of a reference for a frequency at which the motor 200 does not rotate and a reference for a magnitude of saturating an air gap of the stator.

That is, the first waveform current and the second waveform current may be changed in magnitude with time, and may be applied with a frequency at which the motor 200 does not rotate and with a magnitude of saturating an air gap of the stator.

Accordingly, when the first waveform current and the second waveform current are applied to the stator of the motor 200, the rotor may be aligned in a state that the rotor is maintained in a stopped state and the air gap of the stator is saturated.

Figure 6:
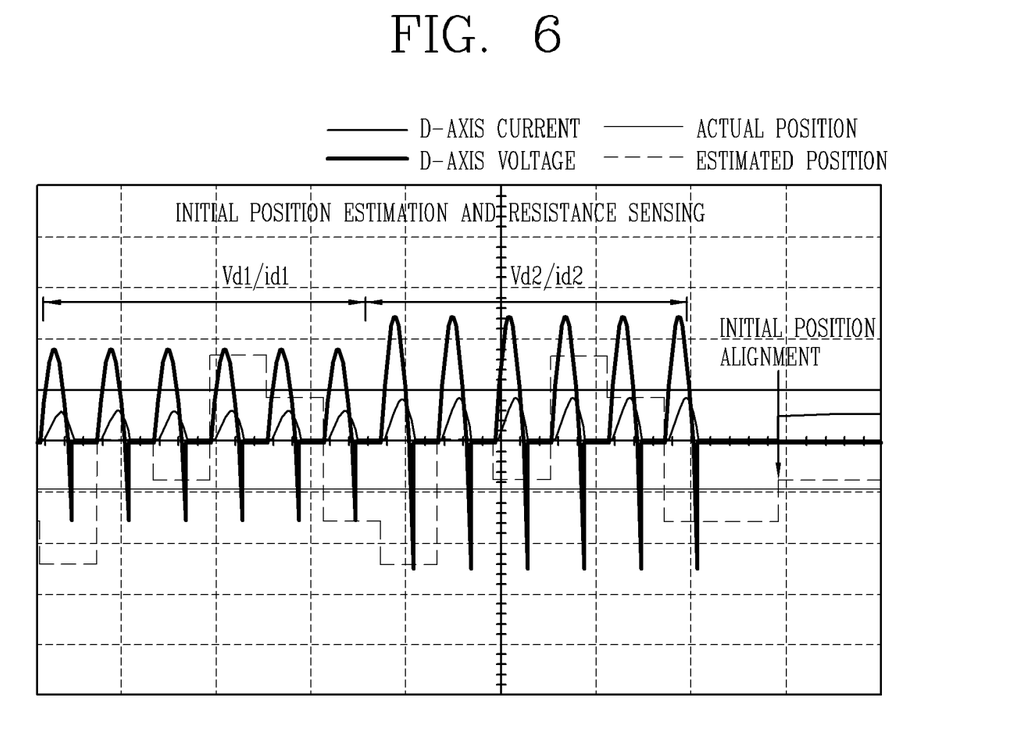
FIG. 6 is an exemplary view illustrating a result of position alignment in a motor control apparatus, a motor control system, and a motor control method in accordance with an embodiment of the present disclosure.

As such, the result of aligning the position of the rotor by applying the first waveform current and the second waveform current to the stator may be as illustrated in FIG. 6.

As illustrated in FIG. 6, when the first waveform current and the second waveform current are applied to the d-axis current, the d-axis voltage is changed in a form of the first waveform current and the second waveform current according to the first waveform current and the second waveform current having a magnitude varying with time, thereby estimating the position of the rotor while applying the first waveform current and the second waveform current. After applying the first waveform current and the second waveform current, the estimated position of the rotor coincides with the actual position of the rotor, so that the position of the rotor may be aligned.

As such, the control unit 120 aligning the position of the rotor by controlling the switching operation so that the first waveform current and the second waveform current are applied to the stator, may detect the stator resistance of the stator based on the motor voltage of the motor 200 according to the result of the application of each of the first waveform current and the second waveform current.

That is, the control unit 120 may calculate the motor voltage according to the result of the application of each of the first waveform current and the second waveform current, and detect the stator resistance based on the calculation result.

The stator resistance may be calculated and detected by the following equation.

$$R_s = \frac{\left(v_{ds2}^r - L_s \frac{di_{ds2}^r}{dt}\right) - \left(v_{ds1}^r - L_s \frac{di_{ds1}^r}{dt}\right)}{(i_{ds2}^r - i_{ds1}^r)} \quad \text{[Equation]}$$

$v_{ds}^r$, $v_{qs}^r$: Voltage
$i_{ds}^r$, $i_{qs}^r$: Current
$R_s$: Resistance
$L_s$: Inductance That is, the control unit 120 may detect the stator resistance by calculating the stator resistance value by the equation, based on the inductance of the motor 200, the motor voltage, and the motor current according to the result of the application of the first waveform current and the second waveform current.

As such, the control apparatus 100 aligns the position of the rotor by applying the first waveform current and the second waveform current before the motor 200 starts operating, and detects the stator resistance according to the result of the application of each of the waveform current and the second waveform current so that the position of the rotor and the stator resistance can be detected accurately, and thus the operation the motor 200 can be controlled stably and accurately.

Hereinafter, the motor control system (hereinafter, referred to as a system) according to the present disclosure will be described, but descriptions repeating the above-mentioned contents of the control apparatus 100 may be omitted.

As illustrated in FIG. 2, the system 1000 refers to a motor control system including the inverter unit 110 that converts the input current input from the external power source 10 into a driving current for operating the motor 200 by a switching operation, and the control apparatus 100 that controls the operation of the motor 200 by the switching operation of the inverter unit 110.

The system 1000 may be a system including the motor 200 and the control apparatus 100 to control the driving of the motor 200.

The system 1000 is a system to supply the driving current to the motor 200 to control driving of the motor 200, and may be applied to the motor 200 or to a system to control the motor 200.

The system 1000 may be a control system applied to a home appliance including the motor 200 and the control apparatus 100.

For example, the system 1000 may be applied to a washing machine, a refrigerator, a cleaner, an air conditioner, a water purifier, or a dryer including the motor 200 and the control apparatus 100.

The system 1000 may be a system to control the motor 200 by an inverter method.

The system 1000 may control the operation of the motor 200 by controlling the switching operation of the inverter to control the driving power applied to the motor 200.

The system 1000 may control the driving current by controlling the switching operation to control the operation of the motor 200.

The system 1000 may control the driving of the motor 200 including the control apparatus 100 described above.

The system 1000 may be a system to control the initial operation of the motor 200, that is, a system to control the start of operation of the motor 200.

In the system 1000, the control apparatus 100 aligns the position of the rotor of the motor 200 by applying the first waveform current and the second waveform current having a magnitude varying with time to the stator of the motor 200, when the motor 200 starts operating.

That is, before starting the operation of the motor 200, the system 1000 may control the initial operation of the motor 200, after the control apparatus 100 applies the first waveform current and the second waveform current to the stator to align the position of the motor 200.

In the system 1000, the control apparatus 100 may include the inverter unit 110 and the control unit 120 that detects the motor current flowing in the motor 200 and controls the switching operation of the inverter unit 110 based on a result of the detection to control the operation of the motor 200.

In the system 1000, the control apparatus 100 may apply the first waveform current and the second waveform current to align the position of the rotor to the stator in a form varying in magnitude with time.

The first waveform current and the second waveform current may be a sine wave form as illustrated in FIG. 5.

The first waveform current and the second waveform current may also be a form in which the sine wave is half-wave rectified.

The first waveform current and the second waveform current may also be a form of pulse having a plurality of cycles.

The first waveform current and the second waveform current may have a preset interval y between the pulses.

The first waveform current and the second waveform current may be a sawtooth shape.

In the system 1000, the control apparatus 100 may control the d-axis current with respect to the magnetic flux axis of the motor 200 to apply the first waveform current and the second waveform current.

In the system 1000, the control apparatus 100 may apply the first waveform current and the second waveform current to the stator for a preset application time T.

In the system 1000, the control apparatus 100 may apply the first waveform current to the stator for a preset first application time T1, and thereafter, apply the second waveform current to the stator for a preset second application time T2.

In the system 1000, the control apparatus 100 may apply the first waveform current and the second waveform current to the stator with a frequency at which the motor 200 does not rotate.

Accordingly, the motor 200 may be aligned without rotating while the first waveform current and the second waveform current are applied.

In the system 1000, the control apparatus 100 may apply the first waveform current and the second waveform current to the stator with a magnitude of saturating an air gap of the stator.

Accordingly, the position of the motor 200 may be aligned while the first waveform current and the second waveform current are applied and the air gap of the stator is saturated.

In the system 1000, the control apparatus 100 may apply the second waveform current to the stator with a magnitude greater than that of the first waveform current.

For example, the first waveform current may be applied with a magnitude of x[A], and the second waveform current may be applied with a magnitude of ax[A].

In the system 1000, the control apparatus 100 may detect the stator resistance of the stator based on the result of the application of each of the first waveform current and the second waveform current.

For example, the stator resistance may be detected by calculating the stator resistance value according to the equation.

As such, the system 1000 aligns the position of the rotor by applying the first waveform current and the second waveform current before the motor 200 starts operating, and detects the stator resistance according to the result of the application of each of the waveform current and the second waveform current so that the position of the rotor and the stator resistance can be detected accurately, and thus the operation the motor 200 can be controlled stably and accurately.

Hereinafter, the motor control method (hereinafter, referred to as a control method) according to the present disclosure will be described, but descriptions repeating the above-mentioned contents of the control apparatus 100 and the system 1000 may be omitted.

As illustrated in FIG. 2, the control method may refer to a motor control method of the motor control apparatus 100 including the inverter unit 110 that converts the input current received from the external power source 10 by the switching operation into a driving current to operate the motor 200 and outputs the driving current to the motor 200, and the control unit 120 that detects a motor current flowing in the motor 200 and controls the switching operation of the inverter unit 110 based on the result of the detection to control the operation of the motor 200.

That is, the control method may be a method of controlling the motor 200 of the control apparatus 100 described above.

The control method may also be a control method of the system 1000 including the control apparatus 100 described above.

The control method may be a method of detecting stator resistance of the motor 200 or a method of controlling the start of operation of the motor 200 in the control apparatus 100 or in the system 1000.

Figure 7:
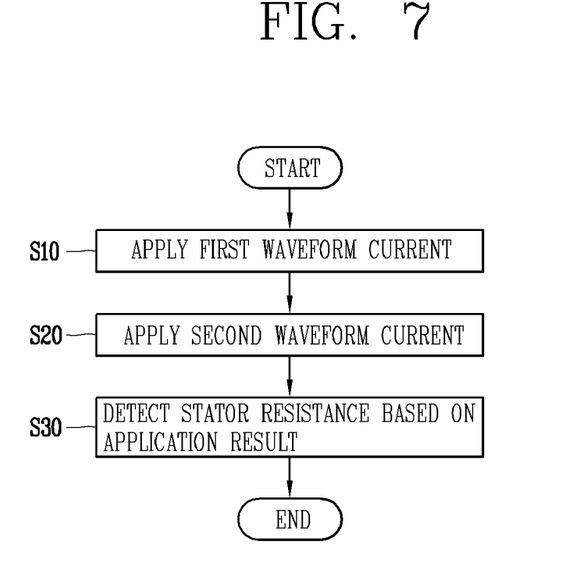
FIG. 7 is a flowchart illustrating steps of a motor control method according to the present disclosure.

The control method may include a step S10 of applying the first waveform current having a magnitude varying with time to the stator of the motor 200, a step S20 of applying the second waveform current having a magnitude varying with time to the stator, and a step S30 of detecting stator resistance of the stator based on the result of the application of each of the first waveform current and the second waveform current, as illustrated in FIG. 7.

That is, the control apparatus 100 applies the first waveform current S10, and applies the second waveform current S20, then detects the stator resistance of the stator based on the result of the application of each of the first waveform current and the second waveform current S30 to align the position of the motor 200, wherein the control method may align the position of the motor in the order as described above.

The applying of the first waveform current S10 may be an operation in which the inverter unit 110 applies the first waveform current to the stator by the control of the control unit 120, when the motor 200 starts operating.

In the applying of the first waveform current S10, the first waveform current may be applied to the stator by controlling the d-axis current with respect to the magnetic flux axis of the motor 200.

In the applying of the first waveform current S10, the first waveform current may be applied to the stator in a form that changes in magnitude with time.

In the applying of the first waveform current S10, the first waveform current may be applied to the stator in the form of sine wave.

In the applying of the first waveform current S10, the first waveform current may be applied to the stator in a form in which the sine wave is half-wave rectified.

In the applying of the first waveform current S10, the first waveform current may be applied to the stator in a form of pulse having a plurality of cycles.

In the applying of the first waveform current S10, the first waveform current may be applied to the stator in a form having a preset interval y between the pulses.

In the applying of the first waveform current S10, the first waveform current may be applied to the stator in a form of a sawtooth.

In the applying of the first waveform current S10, the first waveform current may be applied to the stator with a frequency at which the motor 200 does not rotate.

In the applying of the first waveform current S10, the first waveform current may be applied to the stator with a magnitude of saturating an air gap of the stator.

In the applying of the first waveform current S10, the first waveform current may be applied to the stator with a magnitude smaller than that of the second waveform current.

In the applying of the first waveform current S10, the first waveform current may be applied to the stator during a preset first application time.

That is, in the applying of the first waveform current S10, the control unit 120 may allow the inverter unit 110 to apply the first waveform current to the stator during the first application time, wherein the inverter unit 110 may apply the first waveform current to the stator during the first application time according to the control of the control unit 120.

In the applying of the second waveform current S20, the inverter unit 110 may apply the second waveform current to the stator by the control of the control unit 120, after the step of applying the first waveform current S10.

In the applying of the second waveform current S20, the second waveform current may be applied to the stator by controlling the d-axis current with respect to the magnetic flux axis of the motor 200.

In the applying of the second waveform current S20, the second waveform current may be applied to the stator in a form that changes in magnitude with time.

In the applying of the second waveform current S20, the second waveform current may be applied to the stator in the form of sine wave.

In the applying of the second waveform current S20, the second waveform current may be applied to the stator in a form in which the sine wave is half-wave rectified.

In the applying of the second waveform current S20, the second waveform current may be applied to the stator in a form of pulse having a plurality of cycles.

In the applying of the second waveform current S20, the second waveform current may be applied to the stator in a form having a preset interval y between the pulses.

In the applying of the second waveform current S20, the second waveform current may be applied to the stator in a form of a sawtooth.

In the applying of the second waveform current S20, the second waveform current may be applied to the stator with a frequency at which the motor 200 does not rotate.

In the applying of the second waveform current S20, the second waveform current may be applied to the stator with a magnitude of saturating an air gap of the stator.

In the applying of the second waveform current S20, the second waveform current may be applied to the stator with a magnitude greater than that of the first waveform current.

In the applying of the second waveform current S20, the second waveform current may be applied to the stator during a preset second application time.

That is, in the applying of the second waveform current S20, the control unit 120 may allow the inverter unit 110 to apply the second waveform current to the stator during the second application time, wherein the inverter unit 110 may apply the second waveform current to the stator during the second application time according to the control of the control unit 120.

In the detecting of the stator resistance S30, the control unit 120 may detect the stator resistance based on the result of the application of each of the first waveform current and the second waveform current, after applying the second waveform current S20 to the stator.

In the detecting of the stator resistance S30, the stator resistance may be detected by calculating the motor voltage according to the result of the application of each of the first waveform current and the second waveform current.

In the detecting of the stator resistance S30, the stator resistance may be detected by calculating the stator resistance value according to the equation.

As such, the control method applies the first waveform current S10, and applies the second waveform current S20, then detects the stator resistance based on the result of the application of each of the first waveform current and the second waveform current S30 to align the position of the motor 200 so that the position of the rotor and the stator resistance can be detected accurately, and thus the operation the motor 200 can be controlled stably and accurately.

The control method including the applying of the first waveform current S10, the applying of the second waveform current S20, and the detecting of the stator resistance S30 can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 120.

Embodiments of the motor control apparatus, the motor control system, and the motor control method described above may be applicable to the motor control apparatus provided in the motor, such as an inverter device controlling the motor, a motor including the same, or a control method of such a motor. In particular, the embodiments may be applicable to the apparatus, system, and method to control the initial operation of the motor, and to align and detect the position of the motor. In addition, the embodiments may also be applicable to a compressor control apparatus provided in a compressor including a motor, such as an inverter device to control the motor of the compressor, the compressor including the same, or a control method of such a compressor, and the like. However, the technology disclosed herein is not limited thereto, and may be applicable even to any apparatus, system, and method to control motors, home appliances including the motors, and any apparatus, system and method to control home appliances including the motors to which the technical idea of the technology can be applied.

Detailed embodiments of the present disclosure have been described so far, but various modifications may be applicable within a scope of the present disclosure. Therefore, the scope of the present disclosure may not be limited to the described embodiments, but may be determined not only by the claims below but also by the equivalents of the claims.

As mentioned above, although the present disclosure has been described by way of limited embodiments and drawings, but is not limited to the above-described embodiments, which can be adjusted or modified by those skilled in the art to which the present disclosure pertains. Accordingly, the idea of the disclosure should be understood only by the claims set forth below, and all the equivalents or equivalent modifications thereof will fall within the scope of the idea of the disclosure.

What is claimed is:

1. A motor control apparatus comprising:
   an inverter that is configured to, based on a switching operation, convert an input current received from an external power source into a driving current for operating a motor, the inverter being configured to output the driving current to the motor; and
   a controller configured to:
      detect a motor current in the motor,
      control the switching operation of the inverter based on the motor current to thereby control an operation of the motor, and
      based on starting the operation of the motor, drive the motor to an alignment position by controlling the switching operation to apply a first waveform current and a second waveform current to a stator of the motor, each of the first waveform current and the second waveform current having a magnitude configured to vary with time,
   wherein each of the first waveform current and the second waveform current is half-wave rectified and has a positive value,
   wherein the motor is configured to define a d-axis based on magnetic flux of the motor,
   wherein the first waveform current and the second waveform current are currents corresponding to the d-axis, and
   wherein direct current (DC) offsets of the first waveform current and the second waveform current are equal to each other.

2. The motor control apparatus of claim 1, wherein each of the first waveform current and the second waveform current comprises a sine waveform.

3. The motor control apparatus of claim 2, wherein each of the first waveform current and the second waveform current is defined by rectifying the sine waveform into a half-waveform.

4. The motor control apparatus of claim 3, wherein each of the first waveform current and the second waveform current comprises a pulse-type waveform having a plurality of cycles.

5. The motor control apparatus of claim 4, wherein the pulse-type waveform has a preset interval between adjacent pluses.

6. The motor control apparatus of claim 1, wherein each of the first waveform current and the second waveform current defines a sawtooth waveform.

7. The motor control apparatus of claim 1, wherein the DC offsets of the first waveform current and the second waveform current are zero.

8. The motor control apparatus of claim 7, wherein the first waveform current and the second waveform current are defined according to a preset condition.

9. The motor control apparatus of claim 8, wherein the preset condition comprises at least one of a reference frequency at which the motor is configured to not rotate or a reference magnitude of current that saturates an air gap of the stator.

10. The motor control apparatus of claim 1, wherein the controller is configured to apply the first waveform current to the stator during a preset first application time, and then apply the second waveform current to the stator during a preset second application time.

11. The motor control apparatus of claim 10, wherein the magnitude of the second waveform current is greater than the magnitude of the first waveform current.

12. The motor control apparatus of claim 1, wherein the controller is configured to detect a stator resistance of the stator based on a motor voltage of the motor according to the first waveform current and the second waveform current.

13. A motor control system comprising:
   a motor comprising a stator and a rotor; and
   a control apparatus comprising an inverter that is configured to, by a switching operation, convert an input current received from an external power source into a driving current for operating the motor, the inverter being configured to output the driving current to the motor,
   wherein the control apparatus configured to:
      control an operation of the motor by the switching operation of the inverter,
      based on starting the operation of the motor, drive the rotor to an alignment position by applying a first waveform current and a second waveform current to the stator, each of the first waveform current and the second waveform current having a magnitude configured to vary with time,
   wherein each of the first waveform current and the second waveform current is half-wave rectified and has a positive value,
   wherein the motor is configured to define a d-axis based on magnetic flux of the motor,
   wherein the first waveform current and the second waveform current are currents corresponding to the d-axis, and wherein direct current (DC) offsets of the first waveform current and the second waveform current are equal to each other.

14. The motor control system of claim 13, wherein the control apparatus is configured to apply the first waveform current to the stator for a preset first application time, and then apply the second waveform current to the stator for a preset second application time.

15. The motor control system of claim 13, wherein the control apparatus is configured to apply the first waveform current and the second waveform current to the stator with a frequency at which the motor is configured to not rotate.

16. The motor control system of claim 13, wherein the control apparatus is configured to apply the first waveform current and the second waveform current to the stator with a magnitude that saturates an air gap of the stator.

17. The motor control system of claim 13, wherein the magnitude of the second waveform current to the stator is greater than the magnitude of the first waveform current.

18. The motor control system of claim 13, wherein the control apparatus is configured to detect a stator resistance of the stator based on applying the first waveform current and the second waveform current to the stator.

19. A motor control method for controlling a motor, the method comprising:
    detecting a motor current in the motor;
    controlling a switching operation of an inverter based on the motor current to thereby control an operation of the motor;
    based on starting the operation of the motor, driving the motor to an alignment position by controlling the switching operation;
    applying a first waveform current to a stator of the motor, the first waveform current being a half-wave rectified current having a first magnitude that is a positive value and configured to vary with time;
    applying a second waveform current to the stator of the motor, the second waveform current being a half-wave rectified current having a second magnitude that is a positive value and configured to vary with time; and
    detecting a stator resistance of the stator based on applying each of the first waveform current and the second waveform current to the stator,
    wherein the motor is configured to define a d-axis based on magnetic flux of the motor,
    wherein the first waveform current and the second waveform current are currents corresponding to the d-axis, and
    wherein direct current (DC) offsets of the first waveform current and the second waveform current are equal to each other.

20. The method of claim 19, wherein applying the first waveform current comprises applying the first waveform current to the stator for a preset first application time, and wherein applying the second waveform current comprises applying the second waveform current to the stator for a preset second application time.

* * * * *